O. C. RITZ-WOLLER.
LIQUID GAGE LOCK.
APPLICATION FILED MAR. 5, 1913.
1,088,727.
Patented Mar. 3, 1914.
2 SHEETS—SHEET 2.
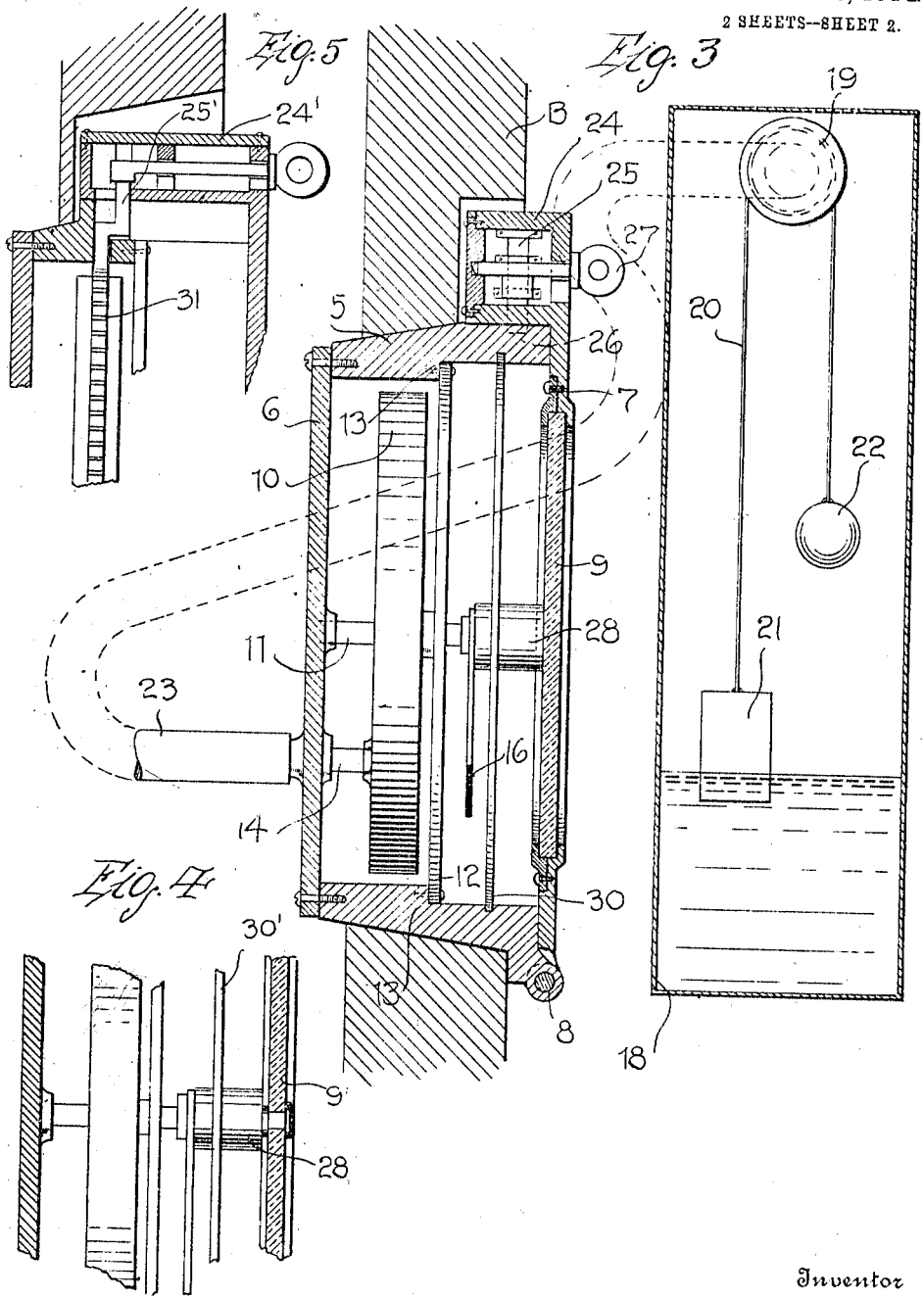
Witnesses
Robert M. Sutphen
A. I. Hind
Inventor
OLIVER C. RITZ-WOLLER
By Watson E. Coleman
Attorney

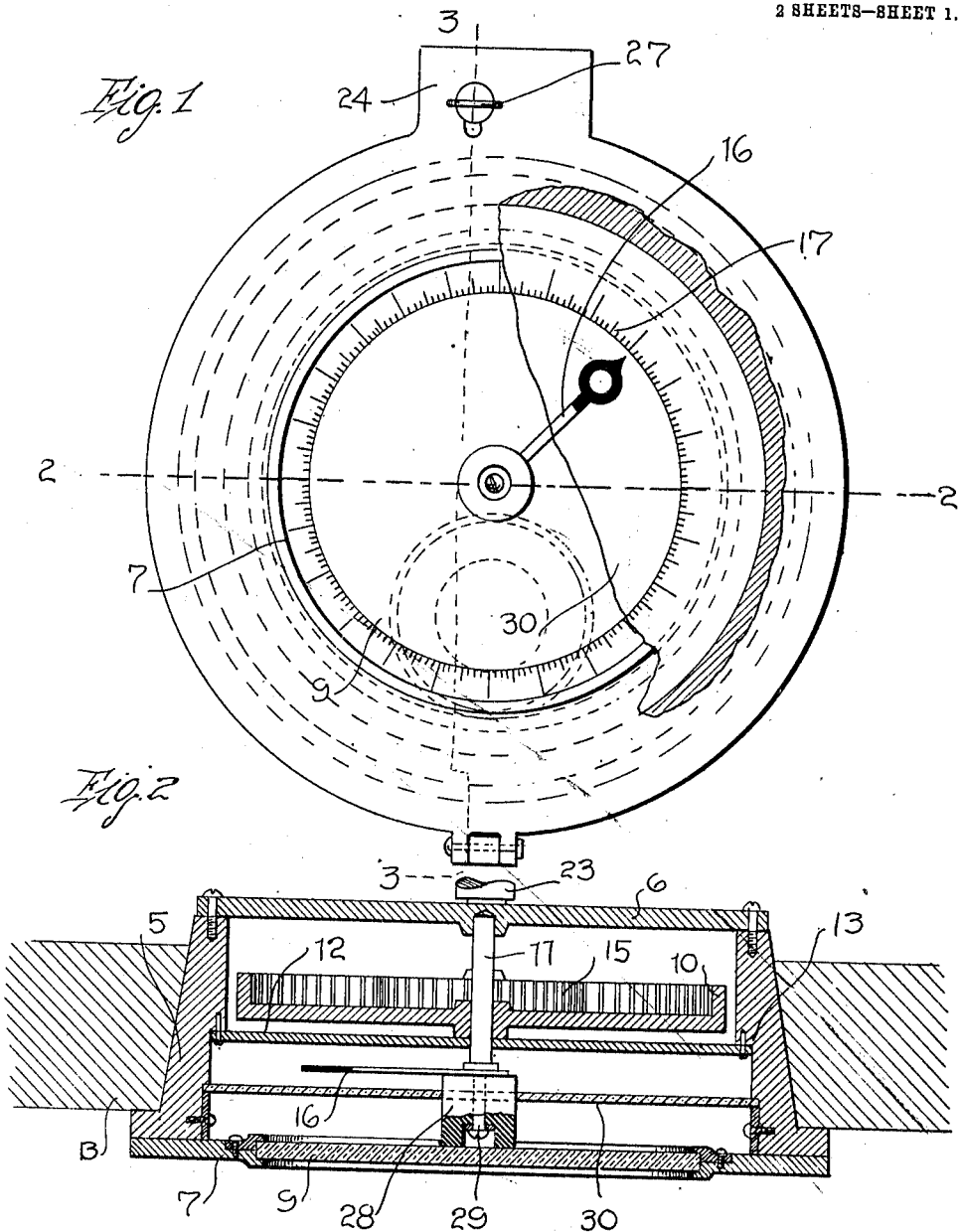

UNITED STATES PATENT OFFICE.

OLIVER C. RITZ-WOLLER, OF JACKSONVILLE, FLORIDA.

LIQUID-GAGE LOCK.

1,088,727.  Specification of Letters Patent.  Patented Mar. 3, 1914.

Application filed March 5, 1913. Serial No. 752,152.

*To all whom it may concern:*

Be it known that I, OLIVER C. RITZ-WOLLER, citizen of the United States, residing at Jacksonville, in the county of Duval and State of Florida, have invented certain new and useful Improvements in Liquid-Gage Locks, of which the following is a specification, reference being had to the accompanying drawings.

This invention relates to improvements in liquid gage locks and has for its primary object to provide improved means for locking an indicating gage used in connection with gasolene storage tanks such as are carried by automobiles and other motor vehicles.

Another object of the invention is to provide simple and effective means for positively locking the indicating mechanism against operation after the car has been used whereby, when said mechanism is released, it will immediately indicate the fact that gasolene has been consumed and the car used without permission of the owner.

A still further object of the invention resides in the provision of a device for the above purpose which is simple in construction, may be inexpensively produced, and is highly reliable and efficient in operation.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a front or face view of a gage partly in section to which my improved locking device is applied; Fig. 2 is a section taken on the line 2—2 of Fig. 1; Fig. 3 is a vertical section taken on the line 3—3 of Fig. 1, which also shows a reduced sectional view of a liquid containing tank. Fig. is a detail section illustrating a slightly modified form of the invention; and Fig. 5 is a detail section showing a still further modification.

Referring in detail to the drawings, 5 designates the casing containing the indicating mechanism which is mounted in any suitable part of the vehicle body indicated at B. One side of this casing is permanently closed by the back plate 6. The face plate indicated at 7 is hingedly mounted upon the annular wall of the casing 5 as indicated at 8. This face plate carries the glass disk 9.

The indicating mechanism arranged within the casing 5 includes an internal gear wheel 10 fixed upon the indicator shaft 11 journaled in a suitable bearing provided upon the back plate 6 and extending centrally through the dial plate 12, which plate is secured at its edges to an internal shoulder 13 provided upon the annular wall of the casing 5. A stub shaft 14 is rotatably mounted in the back plate 6 of the casing and carries a pinion indicated at 15 for engagement with the teeth of the internal gear 10.

16 indicates the pointer which is fixed upon the shaft 11 and has its outer end disposed in juxtaposition to the annular graduated scale 17 provided upon the face of the dial plate 12.

The gage tank casing which may be of any desired construction is indicated by the numeral 18 and a shaft is mounted in the upper end of said casing upon which a sprocket wheel 19 is fixed. The sprocket chain or other flexible element 20 extends around this sprocket wheel and to one end of the same the float 21 is attached, a counterbalancing weight 22 being secured to the opposite end of said flexible element. A flexible shaft 23 connects the shaft of the sprocket wheel 19 with the stub shaft 14 whereby rotation is transmitted to the gear wheel 10 of the indicating mechanism as the float 21 descends, in the consumption of the gasolene.

The hinged front or face plate 7 of the indicator casing 5 carries a lock casing 24 in which the sliding locking bolt 25 is mounted, said bolt being movable through one wall of the casing 5 and adapted for engagement in a recess indicated at 26 in the top of the annular wall of the casing 5. This bolt is actuated by means of a suitable key 27. Upon the outer end of the shaft 11 of the indicator mechanism, a rubber abutment block 28 is loosely mounted, said block being arranged upon a stem or stud bolt 29 projecting longitudinally from the end of said shaft. The inner end of this block engages the pointer 16 while the outer end thereof is engaged by the glass disk 9 in the face plate 7 when said plate is moved to its closed position, as clearly shown in Fig. 2. A glass plate 30 is permanently mounted in the annular wall of the indicator casing through which the yieldable rubber block extends and by which the same is supported.

In the operation of the invention as above described, when the face plate 7 is in its open position, the indicating mechanism is operated through the medium of the flexible shaft 29 so that the pointer 16 will indicate the depth of gasolene contained in the storage tank to which the gage tube 18 is connected in the usual manner. In order to disclose the fact that the automobile or other vehicle has been used without the owner's permission, the face plate 7 is swung upwardly to its closed position so that the disk 9 carried thereby will engage the rubber abutment block 28 and force the same inwardly into close frictional engagement with the pointer 16 which is secured upon the indicator shaft 11. The face plate 7 is locked in its closed position by means of the key 27. By thus locking the indicating mechanism against operation, if the car is used, the float 21 will not descend as the gasolene is consumed but will remain stationary. It is thus apparent that when the face plate is again moved to its open position to release the indicating mechanism, the descent of the float into contact with the surface of the liquid will operate said mechanism to move the indicating pointer 16, thus showing the amount of gasolene which has been consumed and the approximate distance traveled by the machine.

In Fig. 4 of the drawings, I have illustrated a slightly modified arrangement of the parts, wherein the rubber abutment block 28' is fixed to the glass disk 9' which is carried by the movable face plate of the indicator casing. An opening is provided in the stationary glass plate 30' arranged within the indicator casing through which this rubber block is adapted to move into contact with the indicator pointer. The operation of this form of the invention is precisely the same as that above described.

In Fig. 5 of the drawings, I have illustrated still another modified form of the device, wherein the movable front plate for the casing and the rubber block carried thereby is dispensed with and the lock casing 24' is mounted upon the annular wall of the indicator casing. The movable locking bolt 25' is adapted for movement through coinciding openings in the wall of the lock casing and the indicator casing and into engagement with the toothed periphery 31 of one of the gear elements of the indicating mechanism, thereby securely locking the same against operation. It will be understood that in connection with this application of the invention, I may employ a rubber brake shoe carried by the lower end of the locking bolt 25' to frictionally engage the periphery of the gear, instead of providing said gear with teeth.

From the foregoing, it is believed that the construction and manner of operation of the several forms of the invention above disclosed will be clearly and fully understood.

The device is extremely simple in its construction, and may be provided upon gages of this character now in general use without necessitating radical alterations in the construction thereof.

It will also be apparent that the device is highly effective and reliable in practical use.

While I have shown and described the preferred construction and arrangement of the several parts, it will be understood that the invention is susceptible of considerable modification in the form, proportion and arrangements of the several parts thereof without departing from the essential features or sacrificing any of the advantages of the same.

Having thus described the invention, what is claimed is:

1. The combination with a gage including a float, a casing, and indicating mechanism automatically actuated in the movement of said float, of locking means mounted upon the casing of the indicator movable into engagement with one of the elements of the indicating mechanism to lock the same and the float against movement.

2. The combination with a gage including a float, a casing, and indicating mechanism automatically actuated in the movement of the float, of a face plate movably mounted upon the casing of the indicator, means adapted to be engaged by said plate to lock the indicating mechanism against operation, and means for locking said plate against movement.

3. The combination with a gage, including a float, indicating mechanism actuated in the movement of said float, said mechanism including a pointer, of a compressible element adapted to frictionally engage said pointer and lock the mechanism against operation, means coöperating with said element to move the same to effective position, and additional means to lock said last named means against movement.

4. The combination with a gage including a movable float, indicating mechanism and actuating means therefor operated by the movement of the float, of a casing for said indicating mechanism, said mechanism including a pointer, a hinged face plate for the casing, means adapted to be engaged by said face plate when the same is moved to its closed position and moved into engagement with the pointer to lock the indicating mechanism against operation, and means for locking said face plate in its closed position upon the indicator casing.

5. The combination with a gage including a float, indicating mechanism and actuating means therefor actuated by the float, said indicating means including a shaft having a pointer fixed thereto, of a movable friction block a casing for the indicating mechanism, a face plate hingedly mounted upon said casing adapted to move said friction block into engagement with the pointer and lock the indicating mechanism against operation, and means for locking the face plate in its closed position upon the casing.

6. The combination with a gage including a float, indicating mechanism and actuating means therefor operated by the movement of the float, of a casing for said mechanism, said mechanism including a pointer, a compressible friction block mounted in said casing, a face plate hingedly mounted upon the casing wall, a glass disk carried by said plate adapted to engage said compressible element and force the same into frictional engagement with the pointer and lock the indicating mechanism against operation, and means for locking said face plate to the body of the indicator casing.

7. The combination with a liquid gage including indicating mechanism, of means pivotally mounted upon the casing of the indicator and movable into engagement with one of the elements of the indicating mechanism to lock the same against operation, and a locking device carried by said pivoted means to lock the same to the indicator casing.

In testimony whereof I hereunto affix my signature in the presence of two witnesses.

OLIVER C. RITZ-WOLLER.

Witnesses:
M. C. LYDDANE,
CHAS. M. BIRCKHEAD.